United States Patent [19]

Rivers

[11] Patent Number: 4,590,701
[45] Date of Patent: May 27, 1986

[54] FISHING POLE ALARM SYSTEM

[76] Inventor: William B. Rivers, 2268 Park Boulevard, Oakland, Calif. 94606

[21] Appl. No.: 644,636

[22] Filed: Aug. 27, 1984

[51] Int. Cl.⁴ .............................................. A01K 97/12
[52] U.S. Cl. .......................................... 43/17; 43/17.5
[58] Field of Search ...................... 43/15, 16, 17, 17.5, 43/21.2

[56] References Cited

U.S. PATENT DOCUMENTS

| | | | |
|---|---|---|---|
| 3,020,664 | 2/1962 | Snyder et al. | 43/17 |
| 3,264,773 | 8/1966 | Woznick | 43/17 |
| 3,453,767 | 7/1969 | Lake et al. | 43/17 |
| 3,959,911 | 6/1976 | Puckett | 43/17 |
| 4,086,716 | 5/1978 | Donahue | 43/21.2 |
| 4,154,015 | 5/1979 | Holland | 43/17 |
| 4,195,433 | 4/1980 | Engman | 43/17 |
| 4,510,709 | 4/1985 | Melcher | 43/17 |

Primary Examiner—Nicholas P. Godici
Assistant Examiner—M. Jordan
Attorney, Agent, or Firm—Harris Zimmerman; Howard Cohen

[57] ABSTRACT

A fishing pole alarm system for warning of the presence of a fish on the fishing line includes a vertical support such as a tripod, and a detector assembly which is adapted to support the upper end of the fishing rod disposed in inclined fashion with the lower end resting on the ground. The detector assembly includes a channel formed in the upper side thereof and adapted to receive an upper portion of the fishing rod therein. A switch assembly includes a leaf actuator extending into the channel to sense motion of the fishing pole indicative of a fish biting at the baited hook. The switch assembly is connected between a battery power supply and audio and visual indicators to alert the fisherman to set the hook. The detector assembly is secured to the vertical support in pivotable fashion about a horizontal axis, so that the sensitivity of the detector may be selected by varying the proximity of the upper portion of the rod to the leaf actuator, and by selecting which portion of the rod is received in the channel of the detector.

9 Claims, 3 Drawing Figures

U.S. Patent  May 27, 1986  4,590,701
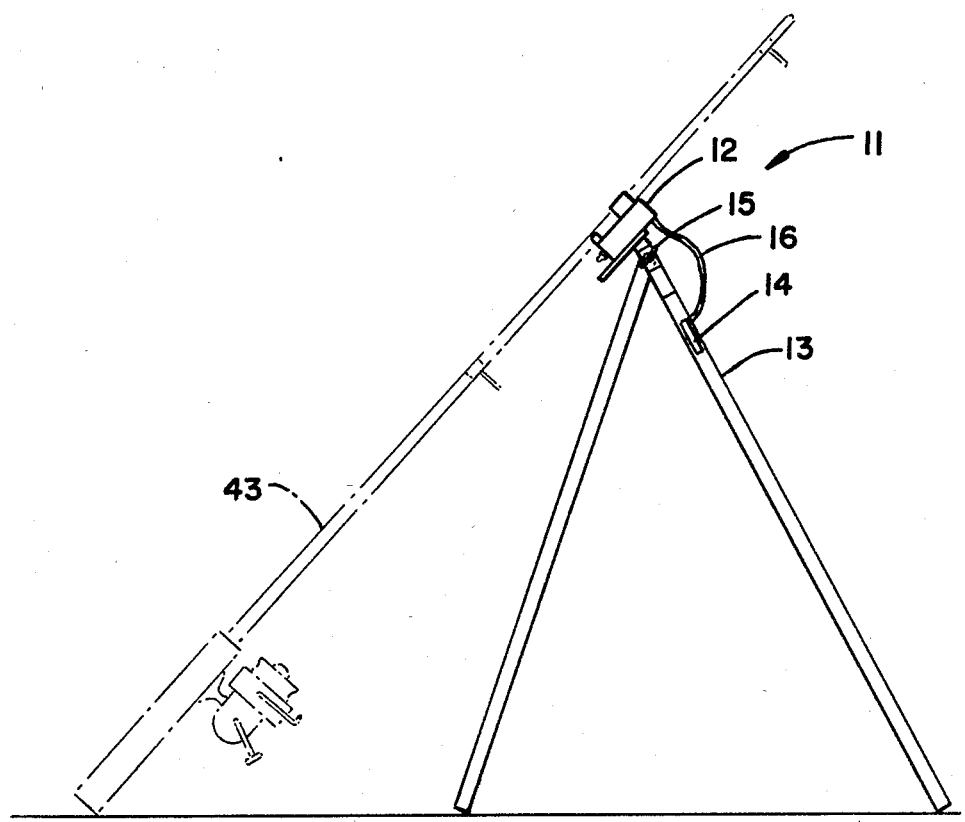
FIG_1
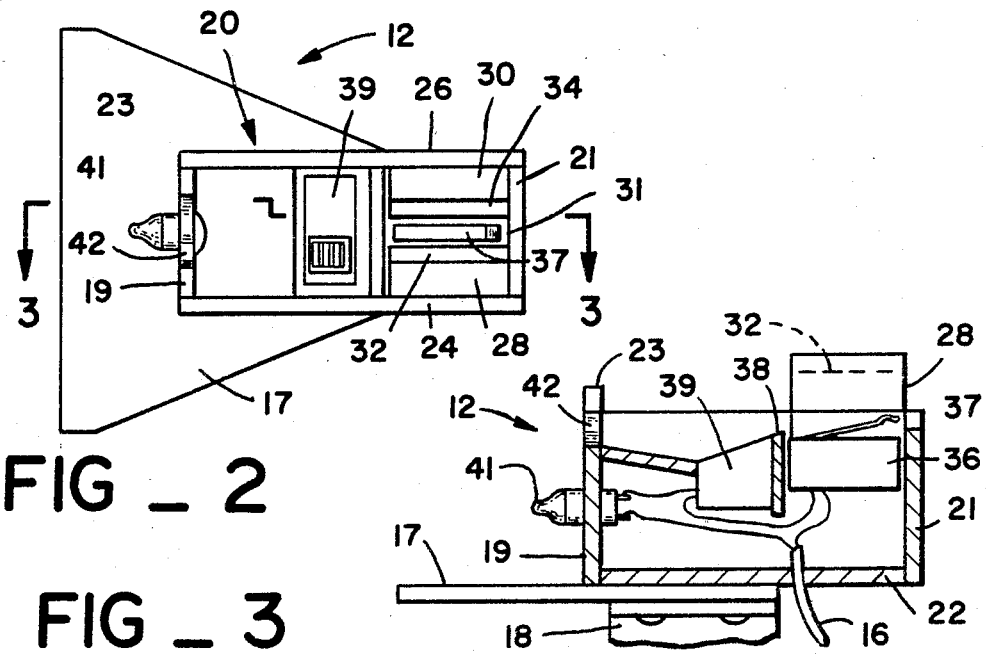
FIG_2
FIG_3

FISHING POLE ALARM SYSTEM

BACKGROUND OF THE INVENTION

Of the many ways for catching fish which have been devised by man since antiquity, a favored method is to impale a hapless worm, shrimp, or the like on a hook secured to a fish line extending from a fishing pole, and to drop the baited hook into the proper spot in fish-infested waters. The questions of which bait is best, where the proper spot is located, and whether the waters are indeed infested with fish are matters which have never been resolved in all the lore of countless fishermen.

However, it is common to all the lore of fishing that fish frequently steal the bait from the hook without becoming hooked themselves. Thus, ironically, the fisherman's dinner becomes his diner, feeding on usually expensive bait such as fresh, live shrimp, blood worms, minnows, and the like. It is remarkable that a cold blooded animal with a tiny brain and no hands at all can so deftly remove the bait from the needle-sharp, barbed hook, and do so without snagging the hook or shaking the line sufficiently to alert the fisherman. This feat is a tribute to the fishes agility and cunning, and is attested to by the large number of bait shops which operate profitably near any popular fishing area. Clearly there is a need to provide a better means of detecting the presence of the fish, so that the fisherman can use his skills to set the hook and catch the fish.

SUMMARY OF THE PRESENT INVENTION

The present invention generally comprises a fishing pole alarm system which is designed to sense and indicate the presence of a fish biting at the baited hook. The invention is adapted to support the fishing rod while at the same time detecting the fish, so that a dual purpose is served.

The fishing pole alarm system includes a vertical support such as a tripod, and a detector assembly which is adapted to support the upper end of the fishing rod when it is disposed in inclined fashion with the lower end resting on the ground. The detector assembly includes a longitudinal upwardly opening channel formed in the upper side thereof which is adapted to receive a selected upper portion of the fishing rod therein. A switch assembly includes a leaf actuator extending into the channel to sense motion of the fishing pole indicative of a fish biting at the baited hook. The switch assembly is connected between a battery power supply and audio and visual indicators to alert the fisherman to set the hook. The detector assembly is secured to the vertical support in pivotable fashion about a horizontal axis, so that the channel may be disposed at any angle from horizontal to vertical.

The sensitivity of the detector may be selected by inclining the detector assembly to vary the proximity of the upper portion of the rod to the leaf actuator, thus determining the amplitude of the rod vibration required to close the switch. The sensitivity of the device is also adjustable by selecting the portion of the rod received in the channel of the detector, the rod tip portion being the most flexible and the most responsive to changes in tension on the line.

BRIEF DESCRIPTION OF THE DRAWING

FIG. 1 is a plan elevation of the fishing pole alarm system of the present invention, shown in typical use.

FIG. 2 is a top view of the detector assembly of the fishing pole alarm assembly of the present invention.

FIG. 3 is a cross-sectional elevation of the detector assembly, taken along line 3—3 of FIG. 2.

DESCRIPTION OF THE PREFERRED EMBODIMENT

The present invention generally comprises a fishing pole alarm system which is designed to warn a fisherman of the presence of a fish biting at the bait or other attractant being presented at the end of the fishing line. With reference to FIG. 1, the fishing pole alarm system 11 includes a detector assembly 12 which is secured to a vertical support member 13. In the preferred embodiment the vertical support comprises a tripod having a pivotting mount 15 to secure the detector assembly. There are many tripod constructions and pivoting mounts known in the prior art, and these components do not form any independent part of the present invention. A battery power supply 14 is secured to one of the legs of the tripod, and is connected to the detector assembly through a cable 16.

With reference to FIGS. 2 and 3, the detector assembly 12 is supported on a base plate 17 which is joined to the pivoting support 15 by a right angle bracket member 18. A generally rectangular housing 20 is defined by a pair of end walls 19 and 21 extending orthogonally from a bottom panel 22 which is joined to the base plate 17. As shown in FIG. 3, the bottom panel 22 is cantilevered with respect to the base plate 17. A pair of longitudinally extending side walls 24 and 26 extend upwardly from the bottom panel and are joined to the end walls to form the housing 20. It may be noted in FIG. 3 that the end wall 21 and the side walls 24 and 26 are equal in height, while the end wall 19 includes a portion 23 extending slightly above the adjacent walls.

A salient feature of the present invention is the provision of a pair of longitudinally extending blocks 28 and 30 which are joined to the inner surfaces of side walls 24 and 26, respectively, in confronting fashion. The blocks extend upwardly above the side and end walls to define a narrow channel 31 therebetween which is adapted to receive a portion of a fishing rod. The blocks 28 and 30 are provided with confronting upper bevelled portions 32 and 34 which act as a guide in placing a portion of the fishing rod in the channel 31. A normally open electrical switch 36 is supported within the housing 20 between the blocks 26 and 28. The switch includes a leaf actuator 37 extending upwardly into the channel 31. The switch requires a small force exerted on the leaf actuator to close the contacts and complete a circuit.

The housing 20 also includes a medial wall 38 extending between the side walls in orthogonal fashion. A modular sound transducer 39 is supported between the side walls and abutting the medial wall 38. In addition, a warning lamp 41 is supported in a socket which extends through the end wall 19. It may be appreciated that the switch 36 is connected between the battery power supply and both the sound transducer 39 and the lamp 41, so that closure of the switch actuates the transducer to produce a sharp warning sound and causes the lamp to be illuminated.

It should be noted that the end wall 19 is provided with a notch 42 extending into the upper edge of the portion 23 as well as the upper portion of the wall 19 itself. The notch 42 is adapted to receive the fishing rod also, so that the effective length of the channel 31 is substantially the entire length of the housing. The notch 42 thus aids in supporting and retaining the fishing rod in the channel.

With reference to FIG. 1, the present invention is employed by first setting up the tripod support 13 with the detector secured thereto. A fishing rod having a line and a baited hook at the end thereof is used by casting the hook end into the water, and then resting the lower end of the rod on the ground adjacent to the tripod. The upper end portion of the rod is supported in the channel 31, with the rod extending directly adjacent to the leaf actuator 37. Whenever a fish nibbles at the bait, this action will cause the tip of the rod to wiggle and vibrate to a slight degree. This motion, which may not be sufficient to attract the notice of the fisherman, will cause the rod to strike the leaf actuator and close the switch. The audio and visual alarm will then alert the fisherman of the presence of the fish, so that he may set the hook and catch the fish.

The sensitivity of the detector assembly is variable to minimize false alarms due to wave action and the like. Due to the fact that the tip of the fishing rod undergoes motion of the greatest amplitude when the fishing line is tugged by the fish, the device is most sensitive when the tip portion is disposed in the channel 31. Thus the fisherman may select the portion of the rod received in the channel 31 to thereby adjust the sensitivity to the desired degree. Also, it is significant that the angle of inclination of the detector may be varied, along with the angle at which the rod is supported, so that the proximity of the rod portion to the leaf actuator may be selectively varied to choose the amount of rod motion necessary to actuate the switch.

I claim:

1. A fishing pole alarm system for warning of the presence of a fish on a fishing line, including; vertical support means; a detector assembly adapted to support an upper end of the fishing rod disposed in inclined fashion with a lower end resting on the ground, said detector assembly including a channel formed in an upper side thereof and adapted to receive an upper portion of the fishing rod therein, said detector assembly further including a generally rectangular housing having opposed end and side walls, and a notch formed in one of said end walls adapted to receive a portion of the fishing rod, switch means including an actuator extending into said channel to sense motion of the fishing pole indicative of a fish biting at the line, and alarm means connected to said switch means for alerting a fisherman when said switch means is actuated.

2. The fishing pole alarm system of claim 1, wherein said channel opens generally upwardly to receive the fishing rod.

3. The fishing pole alarm system of claim 1, further including means for selectively varying the sensitivity of the device to motion of the fishing pole.

4. The fishing pole alarm system of claim 3, wherein said last mentioned means includes a pivoting mount for joining said detector assembly to said vertical support means at a wide range of angles with respect to horizontal.

5. The fishing pole alarm system of claim 1, wherein said actuator comprises a leaf actuator extending parallel to and into said channel.

6. The fishing pole alarm system of claim 1, further including a pair of guide blocks joined to respective ones of said side walls in confronting relationship to define said channel therebetween.

7. The fishing pole alarm system of claim 6, wherein said guide blocks further include confronting bevelled portions to guide the rod portion into said channel.

8. The fishing pole alarm system of claim 6, wherein said switch means is supported between said guide blocks.

9. The fishing pole alarm system of claim 6, wherein said guide blocks extend upwardly above the adjacent side and end walls.

* * * * *